March 18, 1941.  A. CORY  2,235,420

MECHANICAL MOVEMENT

Filed Oct. 19, 1939   2 Sheets-Sheet 1

Inventor
Anthony Cory
by his Attorney

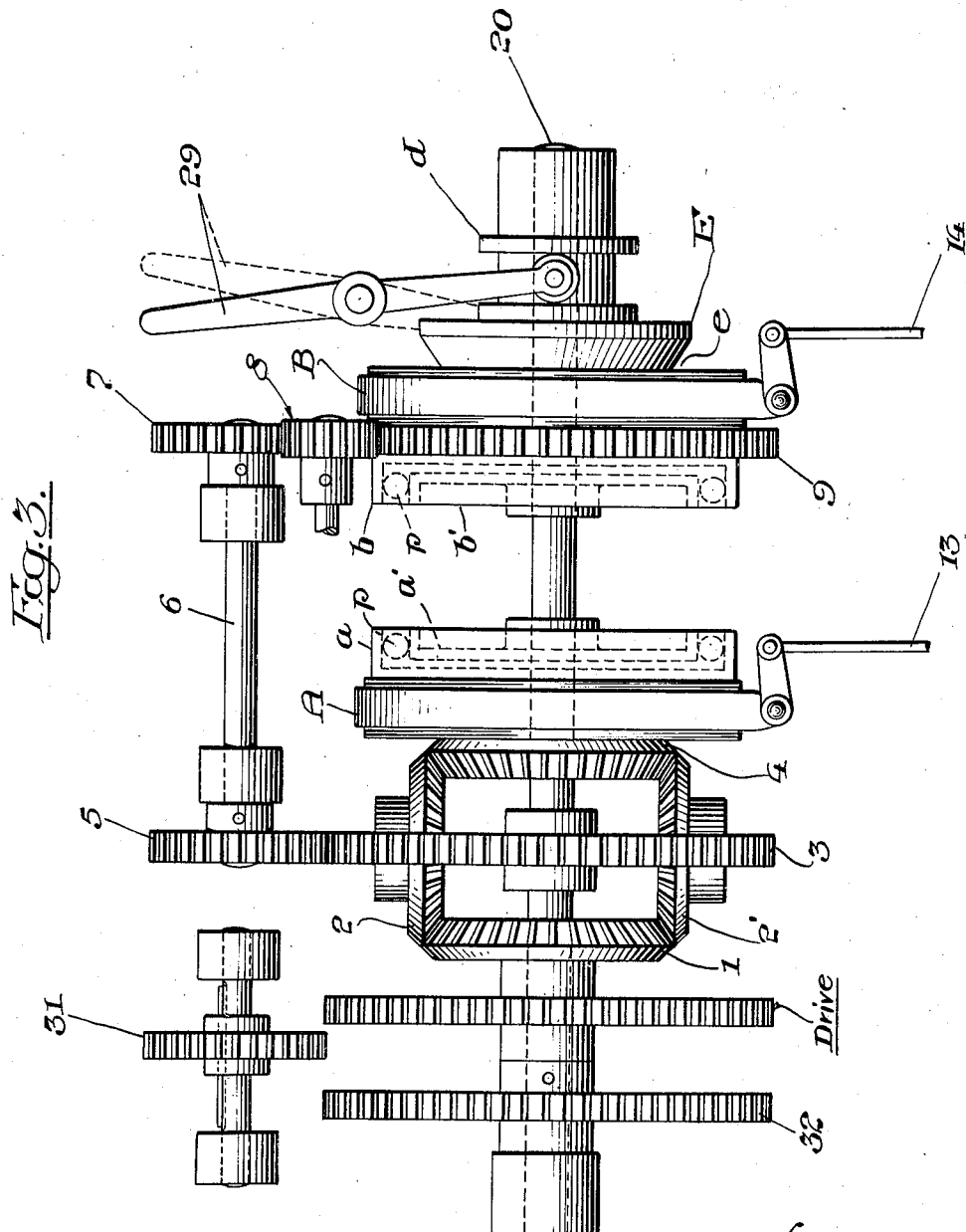

Patented Mar. 18, 1941

2,235,420

UNITED STATES PATENT OFFICE 2,235,420

MECHANICAL MOVEMENT

Anthony Cory, New York, N. Y.

Application October 19, 1939, Serial No. 300,107

22 Claims. (Cl. 74—328)

This invention relates to mechanical movements and more particularly to that type known as differential change speed gearing wherein a change of speed is obtained by a system of gears between two elements, one of which is the driving element and the other the driven element of varied load, thereby necessitating such change of gears, the present invention being an improvement upon the construction shown and described in my Letters Patent No. 2,142,813 of January 3, 1939, and my co-pending application, Serial Number 263,837, filed March 24, 1939.

The principal object of the present invention is the provision of a simple, efficient and inexpensive gear system in which the change from one speed to another may be accomplished automatically or by hand without disconnecting the driving and driven elements, and in which an overdrive or a reverse may be effected in connection therewith by the disengagement of the driving and driven elements by means of shifting from one gear ratio to another.

In the drawings accompanying and forming a part of this specification, Fig. 1 is a plan view of this improved differential change speed gearing together with the operating means therefor.

Fig. 3 is a modification of Fig. 1, in which the reversing means is located before the differential coupling instead of after it, as in Fig. 1, and without the overdrive.

Similar characters of reference indicate corresponding parts in the several views.

Figure 1:
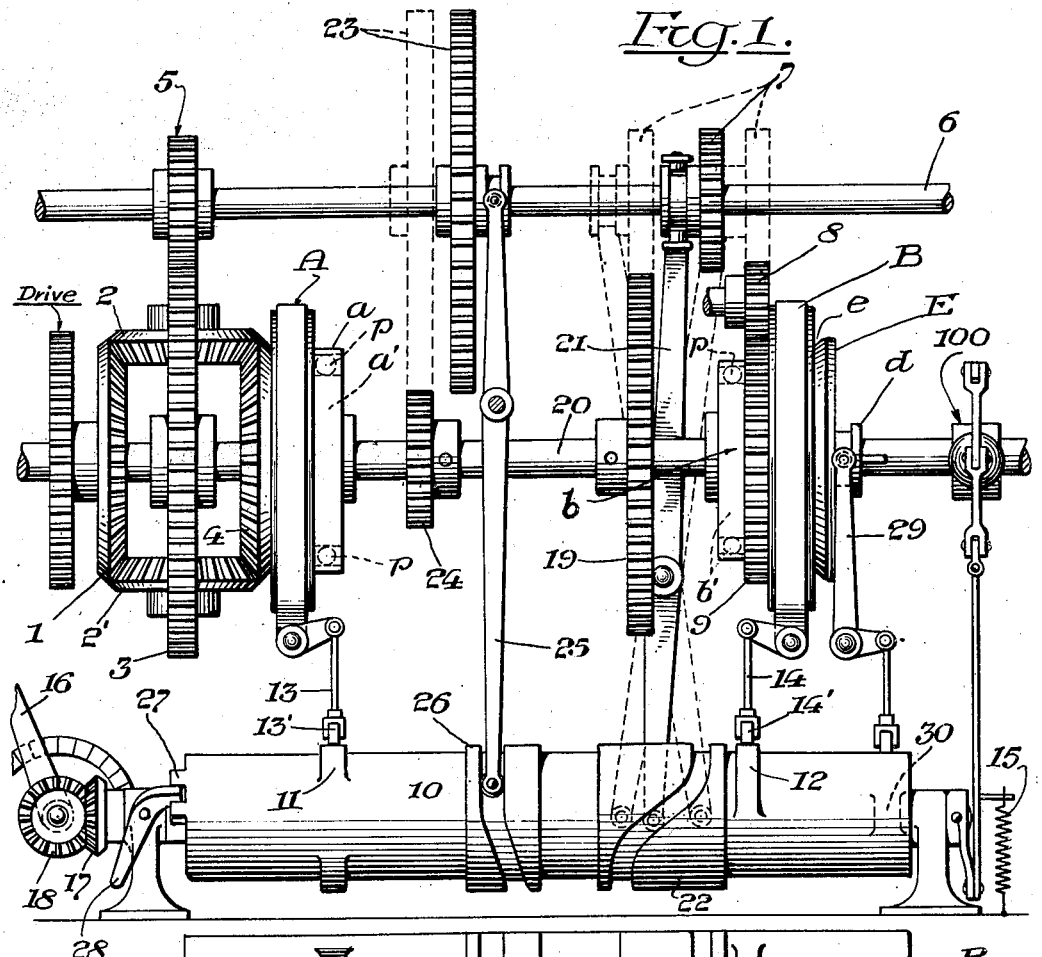
Figure 2:
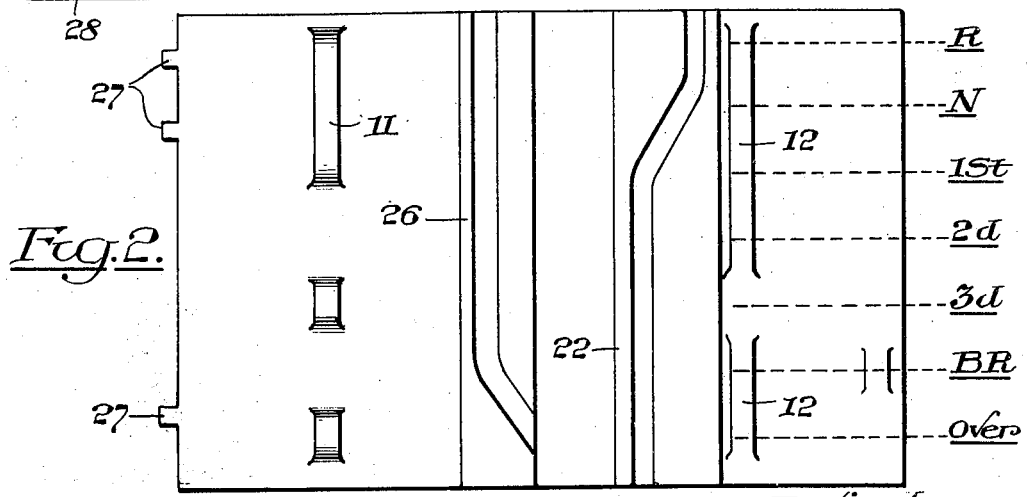
Fig. 2 is a development of the operating cam drum.

Before explaining in detail the present improvement and mode of operation thereof, I desire to have it understood that the invention is not limited to the details of construction and arrangement of parts illustrated in the accompanying drawings since the invention is capable of other embodiments, and that the phraseology employed is for the purpose of description and not of limitation.

The present invention comprises driving means such as a gear, designated in the drawings by the word "drive" and which is adapted for connection in any suitable manner either directly or indirectly to the motor of an automobile (not shown).

This gear is mounted for independent rotation on a shaft 20 extending the entire length of the structure in the present instance, although it may be mounted independently if desired with the various other units on separate shafts.

Secured in any suitable manner for rotation with the "drive" gear is a bevel gear 1 which is likewise mounted on the shaft 20 for independent rotation. This gear 1 is adapted to mesh with a pair or more of bevel pinions 2 and 2' having suitable bearings within a gear 3 which is likewise independently rotatable on the shaft 20. A bevel gear 4 identical to the bevel gear 1 and freely rotatable on the shaft 20 is in mesh with the bevel pinions 2 and 2'.

Secured in any suitable manner to the gear 4 is a brake mechanism A comprising a pulley and brake which, in the present instance, is freely rotatable on the shaft 20. A ratchet mechanism is provided, one member $a$ of which is carried in any suitable manner by the brake mechanism and the other member $a'$ is secured to the shaft 20. This ratchet mechanism has balls $p$ and is constructed in such a manner that the balls will overrun when the shaft is rotating at a greater speed than the gear 4.

In the construction of such a gear coupling unit, one gear is the driving gear and the other two gears the driven gears and, in the present instance, the gear 1 is the driving gear while the gears 3 and 4 are the driven gears. If the gear 1 is rotated in a certain direction and the gear 3 held against rotation, the gear 4 will rotate or be driven by the gear 1 but in the opposite direction at the speed of the gear 1. However, if the gear 4 is held against rotation while the gear 3 rotates, it will be found that the gear 3 rotates in the same direction as the gear 1 but at onehalf the number of revolutions.

Thus, this gear structure comprises a multiple of outlets of power consisting of two in the present instance, and additional outlets may be provided by coupling additional gear coupling units in series as I have illustrated and described in my Patent No. 2,142,813, and each of these outlets has an individual ratio relative to the driving gear. These outlets may be driven separately or simultaneously by the synchronization explained in that patent and not deemed necessary to be repeated herein. When they are operated separately the driven shaft is driven at the speed of the individual outlets. When they are operated simultaneously, the driven shaft is driven at a ratio equal to the sum of the ratios of the combined outlets.

In the structure shown in Fig. 1, the gear 3, which constitutes what may be termed the second outlet of power, the first outlet being through the gear 4, is connected with the shaft 20 by means of a unit consisting of a gear 5 in mesh with the gear 3. This gear 5 is mounted for rotation with the shaft 6 having at its other end a gear 7 adapted for rotation with the shaft but slidably connected therewith for engagement with and disengagement from a suitable idler gear 8 in mesh with a gear 9 freely rotatable on the shaft 20. This gear 9 is connected with the shaft 20 in a manner similar to the gear 4 by means of a brake B and the ratchet and ball mechanism b, p, b'. To simplify the parts and reduce the size of the apparatus, the ratchet mechanism and brake have been placed on opposite sides of the gears in the present instance.

The brakes A and B are provided with suitable operating means and, in this case, I have shown a rotary drum 10 provided with cams 11 and 12 in position to engage links 13 and 14 connected in any suitable manner to the brakes A and B. These links are provided with rollers 13' and 14' for engagement with the cams 11 and 12. Suitable springs (not shown) are connected with the links to hold them against operation until the rollers 13' and 14' are in position to engage the brakes.

The cam drum 10 is normally maintained in position to hold the brakes in their released position by means such as the spring 15 and for manual operation of this drum 10, a lever 16 is provided which has a bevel gear 18 in mesh with a similar gear 17 carried by the drum.

As before stated, the gear 7 is rotatably carried by the shaft 6 for sliding movement in one direction to engage the idler gear 8 to drive the gear 9 from the gear 3 and in the other direction to engage a gear 19 secured to the shaft 20 for rotation therewith. This gear 7 is provided with means for shifting it in either direction such as a shifter link 21 controlled in the present instance by the cam 22 of the cam drum 10. When this gear 7 is between the two positions it is in neutral and when in engagement with the gear 8 it causes the gear 3 to drive the shaft 20 in a forward direction. When it is shifted into engagement with the gear 19 it causes the gear 3 to drive the shaft 20 in reverse direction.

A gear adapted to be shifted into and out of engagement with a gear 24 secured for rotation with the shaft 20, is also carried for rotation with the shaft 6. A link 25 is provided for shifting the gear 23 and is adapted, in the present instance, to be controlled by the cam 26 on the cam drum 10. If desired, this gear 23 may be freely carried by the shaft 6 and left in engagement with the gear 24 and its connection with the shaft 6 is effected by clutch means similar to the clutch E, hereinafter described, the clutch having a part on the shaft and a part on the gear so that disconnection with the motor would be unnecessary to shift into an overdrive. In this event, the link 25 would engage the clutch elements instead of shifting the gear as would be obvious to one skilled in the art.

A governor 100 may also be carried by the shaft 20 for controlling certain speeds of the mechanism through the cam drum.

The cam drum is provided with lugs 27 and a locking element 28 for engagement therewith, the purpose and operation of which will be better understood from the following description of the operation of the present mechanism.

With the drum 10 in neutral position, in order to start the mechanism, the locking element 28, which normally would be operated by the clutch of the automobile, is released and the drum rotated to 1st position at which time the gear 7 is shifted into operative engagment with the gear 8 and both brakes A and B released. The "drive"

gear is driving the gear 1 at a given speed and the gears 3 and 4 driven thereby divide the speed of the gear 1. Since, in this position of the brakes, the two gears 3 and 4 are being driven, the ratchet mechanisms a, p, a' and b, p, b' are rotating and driving the shaft 20 together or synchronously which results in a certain ratio or the equivalent of low speed.

The drum 10 is then rotated into 2nd speed which engages the brake A and stops the gear 4 which permits the gear 3 to be rotated by the gear 1 and the elimination from the driving mechanisms of this gear 4 permits the gear 3 to rotate at a greater speed or one-half the speed of gear 1 which, in turn, drives the shaft through the gears 5, 7, 8 and 9 and the ratchet mechanism b, p, b' at a greater speed or at the equivalent of 2nd speed.

Upon the next rotation of the drum 10, the brake B is applied and the brake A released which stops all the driven gears including gear 3 of one set and permits the driving gear 1 to drive the gear 4 at the speed of the driving gear and this, through the ratchet mechanism a, p, a' drives the shaft 20 at the speed of the driving gear which is the equivalent of high speed.

The change in speed from one ratio to another may be accomplished either by the use of the hand lever 16 or by the governor 100 which is controlled by the speed of the shaft 20, either of which will cause the necessary rotation of the drum.

The shifting of the gear 7 into engagement with the gear 19 will cause the shaft 20 to be driven in a reverse direction and the shifting of the gear 23 into engagement with the gear 24 will effect an overdrive or a resultant speed of the driven shaft greater than the driving media. Obviously, when the overdrive gears are connected, the reverse must be disconnected and, likewise, the brakes between the driving means and the connection of the overdrive gears with the driven shaft must be disengaged. The engagement of subsequent brakes is immaterial provided the disengagement of subsequent gear connections with the shaft such as the gear 7 is effected when the overdrive is in use. However, the gear 7 need not be disengaged from the gear 8 when the overdrive is used if the brake B is released because the ratchet mechanism b, p, b' will overrun without injury to the parts. The locking mechanism and cooperating lugs, 28 and 27, are employed to prevent rotation of the drum to shift the mechanism into reverse or overdrive at a time when injury might result to the gears because of the intermeshing connection of other gears.

Obviously, in the described construction, with the gears connected with the driven shaft by means of the overrunning clutch or ratchet mechanisms, it would be impossible to apply any of the brakes to use the motor for braking purposes, desirable when the car is going down steep hills, and to overcome this difficulty, I have provided a clutch E having its part d located on the shaft 20 and adapted to rotate therewith, and with its part e secured to the gear 9. This clutch is connected by means of a lever 29 to a cam shifter 30 carried by the drum 10. When the drum is shifted to engage the clutch E, it will be apparent that the shaft 20 is driven directly and, therefore, acts as a direct connection with the motor and is the same as shifting positively into a lower speed and permits the engine to act as a brake on the car. At this time, the brake A is applied so that the "drive" is connected to the shaft 29 only through the gear 3 and its associated gears.

In the modified form shown in Fig. 3, the structure is the same as in Fig. 1 except that the overdrive gear connection is eliminated and instead of having the gear 7 shiftable, a shiftable gear 31 is located before the "drive" or between the engine and "drive" in such manner that by shifting the gear 31 in one direction, it will engage the "drive" and when shifted in the other direction, it will engage a gear 32 fast on the shaft 29. The connection of this gear will cause a forward or reverse drive, respectively, and when the gear 31 is disengaged, the mechanism will be in neutral.

The improvement in the present structures over my prior patent and co-pending application is the provision of means comprising, in this instance, a set of gears connected to the driven shaft and positioned either before or after any number of outlets. If positioned before the outlets, it will result in a reverse drive of the driven shaft at a ratio equal to that of the reversing outlet. If positioned after any number of outlets, it is substituted for one of the connections of one of the preceding outlets with the driven shaft and renders all subsequent outlets beyond its connection inoperative.

When the reversible connection is connected to one outlet and only two outlets are used, as in Fig. 1, the driven shaft will be driven forward with an overdrive or reversed according to the ratio of the gears involved, in the following manner.

If the ratio of the driving gear to the driven gear normally connected to the driven shaft is greater than the ratio of the driving gear to the reversibly connected gear on the driven shaft, a resultant forward drive is created in the ratio of the difference between the two comparative ratios which, in some cases, where the resultant ratio is smaller than direct drive (1 to 1), becomes an overdrive, as for example when the gears 23 and 24 are engaged, in Fig. 1. If the ratio of the driving gear to the driven gear normally connected to the driven shaft is smaller than the ratio of the driving gear to the reversibly connected gear on the driven shaft, a resultant reverse is created in the ratio of the difference between the two comparative ratios as, for example, the connection of the gear 7 with the gear 19, in Fig. 1.

When the reversible connection is made after a greater number of outlets as between the brakes B and C of my Patent No. 2,142,813, the same principle is applied except instead of using the ratio of the driving gear to the single gear normally connected to the driven shaft, there would be more gears normally connected to the driven shaft comprising additional outlets and, therefore, the ratio between the driving gear and the sum of the ratios of the total number of gears or outlets must be used.

As hereinbefore explained, the driven gears 3 and 4 of the differential coupling are driven in opposite directions and when both are permitted to run, they divide the speed of the driving gear 1 but when either is stopped, the other gear travels at increased speed. However, when the gears 23 and 24 are engaged, the gear 3 is forced to rotate in the same direction as the gear 4 and instead of these gears 3 and 4 dividing the speed of the gear 1, the speed of the gear 4 is increased over the speed of the gear 1, resulting in the present overdrive.

It is to be understood that, by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. Power transmission mechanism comprising driving means including a differential coupling unit, a driven means, and connecting means therebetween for interchangeably driving the driven means at different speeds and including means shiftably connecting said driving and driven means for effecting an overdrive, thereby to increase the speed of the driven means over the highest speed obtainable through said differential unit and its connecting means.

2. Power transmission mechanism comprising driving means including a differential coupling unit, a driven means, and connecting means therebetween for interchangeably driving the driven means at different speeds and including means shiftably connecting said driving and driven means for effecting an overdrive, thereby to increase the speed of the driven means over the highest speed obtainable through said differential unit and its connecting means and comprising a pair of gears.

3. Power transmission mechanism comprising driving means including a differential coupling unit, a driven means, connecting means therebetween for interchangeably driving the driven means at different speeds and including means shiftably connecting said driving and driven means for effecting an overdrive, thereby to increase the speed of the driven means over the highest speed obtainable through said differential unit and its connecting means, and means for reversing the driven means.

4. Power transmission mechanism comprising driving means including a differential coupling unit, a driven means, connecting means therebetween for interchangeably driving the driven means at different speeds and including means shiftably connecting said driving and driven means for effecting an overdrive, thereby to increase the speed of the driven means over the highest speed obtainable through said differential unit and its connecting means, and means for reversing the driven means and comprising a pair of gears.

5. Power transmission mechanism comprising driving means including a differential coupling unit, a driven means, connecting means therebetween for interchangeably driving the driven means at different speeds and including means for effecting an overdrive, thereby to increase the speed of the driven means over the highest speed obtainable through said differential unit and its connecting means, and means for reversing the driven means, the overdrive and reversing means comprising two sets of disengageable meshing gears, each carried by a shaft and driven through the differential gear unit, the engagement of one set of gears effecting the overdrive and the disengagement thereof and the engagement of the other set of gears effecting the reverse of the driven means, and means for engaging and disengaging said gears.

6. Power transmission mechanism comprising a driven shaft, driving means therefor including a differential gear coupling unit, a gear unit therebetween and the shaft, ratchet mechanism connecting each of said units with the shaft, brake mechanism for each of said ratchet mechanisms, means for selectively operating said brake mechanisms whereby a different speed ratio between the driving means and the shaft will be effected by the selective application and release of said brakes, and means carried by the driven shaft for connection with the driving means and operative as a substitute for one of said ratchet connections for driving the shaft in the reverse direction.

7. Power transmission mechanism comprising driving and driven means, and means connecting said driving and driven means comprising a driving element, a plurality of elements driven thereby at different speeds, means connecting each of said driven elements with the driven means for selectively driving the driven means independently or synchronously, and independent disengageable means connecting one of said driven elements with the driven means and operative as a substitute for one of said first connecting means, the engagement thereof effective to drive said driven means in the reverse direction.

8. Power transmission mechanism comprising driving and driven means, and means connecting said driving and driven means comprising a driving element, a plurality of elements driven thereby at different speeds, means connecting each of said driven elements with the driven means for selectively driving the driven means independently or synchronously, and independent disengageable means connecting one of said driven elements with the driven means, the engagement thereof effective to drive said driven means at a different speed, said last connection located intermediate said first connecting means and adapted to render all subsequent connections between it and the driven means inoperative.

9. Power transmission mechanism comprising driving and driven means, and means connecting said driving and driven means comprising a driving element, a plurality of elements driven thereby at different speeds, means connecting each of said driven elements with the driven means for selectively driving the driven means independently or synchronously, and independent disengageable means connecting one of said driven elements with the driven means, the engagement thereof effective to drive said driven means at a speed greater than the driving means, and independent means interchangeably connecting one of said driven elements with the driven means, the connection thereof effective to drive the driven means in a reverse direction.

10. Power transmission mechanism comprising a driven shaft, driving means therefor including a differential gear coupling unit having a driving element, and a pair of driven elements driven in opposite directions at different speeds, said driven elements each having a connection with the driven shaft for driving the driven shaft independently or synchronously in one direction, and one of said driven elements also having a connection with the driven shaft and operative as a substitute for one of said first connections for driving the driven shaft in a reverse direction.

11. Power transmission mechanism comprising a driven shaft, driving means therefor including a differential gear coupling unit having a driving element, and a pair of driven elements driven in opposite directions at different speeds, said driven elements each having a connection with the driven shaft for driving the driven shaft independently or synchronously in one direction and one of said driven elements also having a disengageable connection with the shaft effective when engaged to reverse the movement of said connected element and increase the speed of said shaft.

12. Power transmission mechanism comprising driving and driven means, a gear train including a differential coupling unit, means connecting each driven gear of the coupling unit with the driven means for selectively driving the driven means independently or synchronously, and means independent of said connecting means for disengageably connecting a driven gear of the coupling unit and effective when engaged to cause an overdrive of said driven means.

13. Power transmission mechanism comprising a driven means, a gear train including a differential coupling unit, means connecting the driven gears of the coupling unit with the driven means for synchronously driving the driven means, means for selectively stopping each of said driven gears to effect a change in speed of the driven means, and disengageable means intermediate said coupling and driven means for connecting a driven gear of said coupling with the driven means and effective when engaged to cause an overdrive of said driven means and render subsequent connections with the driven means inoperative.

14. Power transmission mechanism comprising a driven means, a gear train including a differential coupling unit, means connecting the driven gears of the coupling unit with the driven means for synchronously driving the driven means, means for selectively stopping each of said driven gears to effect a change in speed of the driven means, disengageable means intermediate said coupling and driven means for connecting a driven gear of said coupling with the driven means and effective when engaged to cause an overdrive of said driven means and render subsequent connections with the driven means inoperative, and means for driving the driven means in a reverse direction.

15. Power transmission mechanism comprising driving and driven means, and means connecting said driving and driven means comprising a driving element, a plurality of elements driven thereby at different speeds, means connecting each of said driven elements with the driven means for selectively driving the driven means independently or synchronously, and independent disengageable means connecting one of said driven elements with the driven means, the engagement thereof effective to drive said driven means at a speed greater than the driving means, and independent means interchangeably connecting one of said driven elements with the driven means, the connection thereof effective to drive the driven means in a reverse direction, said disengageable means including a pair of intermeshing gears, one rotatable with the driven means and the other rotatable with a driven gear of the coupling unit, said intermeshing gears effective to reverse the movement of said connected coupling gear.

16. Power transmission mechanism comprising driving and driven means, and means connecting said driving and driven means comprising a driven element, a plurality of elements driven thereby at different speeds, means connecting each of said driven elements with the driven means for selectively driving the driven means independently or synchronously, independent disengageable means connecting one of said driven elements with the driven means, the engagement thereof effective to drive said driven means at a speed greater than the driving means, independent means interchangeably connecting one of said driven elements with the driven means, the connection thereof effective to drive the driven means in a reverse direction, said disengageable means including a pair of intermeshing gears, one rotatable with the driven means and the other rotatable with a driven gear of the coupling unit, said intermeshing gears effective to reverse the movement of said connected coupling gear, and disengageable means intermediate said coupling and driven means including a pair of intermeshing gears, one rotatable with the driven means and the other rotatable with a driven gear of the coupling unit, said means, when engaged, effective to reverse the driven means.

17. Power transmission mechanism comprising a driven shaft, driving means therefor including a plurality of power outlets each having a connection with the shaft for synchronously driving said shaft, means for stopping any of said power outlets to increase the speed of the shaft, and independent means interchangeably connecting one of said power outlets with the shaft to increase the speed of said shaft when connected beyond the speed of the driving means.

18. Power transmission mechanism comprising a driven shaft, driving means therefor including a plurality of power outlets each having a connection with the shaft for synchronously driving said shaft, means for stopping any of said power outlets to increase the speed of the shaft, and independent means interchangeably connecting one of said power outlets with the shaft to increase the speed of said shaft when connected beyond the speed of the driving means, said independent connecting means effective to increase the speed of another power outlet.

19. Power transmission mechanism comprising a driven shaft, driving means therefore including a plurality of power outlets each having a connection with the shaft for synchronously driving said shaft, means for stopping any of said power outlets to increase the speed of the shaft, independent means interchangeably connecting one of said power outlets with the shaft to increase the speed of said shaft when connected beyond the speed of the driving means, said independent connecting means effective to increase the speed of another power outlet, and disengageable means effective when engaged to drive the shaft in reverse.

20. Power transmission mechanism comprising driving and driven means, means connecting said driving and driven means and comprising a driving element, a plurality of elements driven thereby at different speeds, means connecting each of said driven elements with the driven means for selectively driving the driven means independently or synchronously, and independent disengageable means connecting the driving and driven means and operative as a substitute for one of said first connecting means, the engagement thereof effective to drive said driven means in the reverse direction.

21. Power transmission mechanism comprising a driven shaft, driving means therefor including a differential coupling unit having a driving element and a pair of driven elements driven in opposite directions at different speeds, said driven elements each having a connection with the driven shaft for driving said shaft independently or synchronously in one direction, and one of said driven elements also having a disengageable connection with the shaft and operative as a substitute for one of said first connecting means, the speed ratio thereof when engaged affecting the speed and direction of movement of the driven shaft.

22. Power transmission mechanism comprising driving and driven means, and means connecting said driving and driven means comprising a driving element, a plurality of elements driven thereby at different speeds, means connecting each of said driven elements with the driven means for selectively driving the driven means independently or synchronously, and independent disengageable means connecting one of said driven elements with the driven means and operative as a substitute for one of said first connecting means, the speed ratio thereof when engaged affecting the speed and direction of movement of the driven means.

ANTHONY CORY.